United States Patent
Sutaria et al.

(10) Patent No.: US 8,064,583 B1
(45) Date of Patent: Nov. 22, 2011

(54) MULTIPLE DATA STORE AUTHENTICATION

(75) Inventors: Jay Sutaria, Mountain View, CA (US); Brian Daniel Gustafson, Montara, CA (US); Robert Paul van Gent, Redwood City, CA (US); Ruth Lin, Santa Clara, CA (US); David Merriwether, Menlo Park, CA (US); Parvinder Sawhney, Fremont, CA (US)

(73) Assignee: Seven Networks, Inc., Redwood City, CA (US)

( * ) Notice: Subject to any disclaimer, the term of this patent is extended or adjusted under 35 U.S.C. 154(b) by 745 days.

(21) Appl. No.: 11/525,294

(22) Filed: Sep. 21, 2006

Related U.S. Application Data

(63) Continuation of application No. 11/112,690, filed on Apr. 21, 2005.

(51) Int. Cl.
*H04H 3/42* (2006.01)
*H04H 11/00* (2006.01)

(52) U.S. Cl. ............. 379/201.02; 379/93.02; 379/93.03; 379/201.12; 709/217; 709/225; 711/100; 711/150

(58) Field of Classification Search ............... 379/15.03, 379/201.02, 201.12, 93.02, 93.03; 709/217, 709/229, 250, 211, 212, 216, 219, 225; 455/403, 455/411, 412.1, 414.3, 426.1; 711/100, 101, 711/150, 154
See application file for complete search history.

(56) References Cited

U.S. PATENT DOCUMENTS

| | | | |
|---|---|---|---|
| 222,458 A | 12/1879 | Connolly et al. |
| 447,918 A | 3/1891 | Strowger |
| 4,200,770 A | 4/1980 | Hellman et al. |
| 4,255,796 A | 3/1981 | Gabbe et al. |
| 4,276,597 A | 6/1981 | Dissly et al. |
| 4,531,020 A | 7/1985 | Wechselberger et al. |
| 4,807,182 A | 2/1989 | Queen |
| 4,831,582 A | 5/1989 | Miller et al. |
| 4,875,159 A | 10/1989 | Cary et al. |
| 4,897,781 A | 1/1990 | Chang et al. |
| 4,972,457 A | 11/1990 | O'Sullivan |
| 5,008,853 A | 4/1991 | Bly et al. |
| 5,220,657 A | 6/1993 | Bly et al. |
| 5,263,157 A | 11/1993 | Janis |

(Continued)

FOREIGN PATENT DOCUMENTS

EP 0772327 A2 5/1997

(Continued)

OTHER PUBLICATIONS

Allchin, James E., "An Architecture for Reliable Decentralized Systems", UMI Dissertation Services, Copyright 1983.

(Continued)

*Primary Examiner* — Binh K Tieu
(74) *Attorney, Agent, or Firm* — Perkins Coie LLP

(57) ABSTRACT

System and methods for authenticating access to multiple data stores are disclosed. The system may include a server coupled to a network, a client device in communication with the server via the network and a plurality of data stores. The server may authenticate access to the data stores and forward information from those stores to the client device. An exemplary authentication method receives a request for access to data. Information concerning access to that data is stored and associated with an identifier assigned to a client device. If the identifier is found to correspond to the stored information during a future request for access to the store, access to that store is granted.

20 Claims, 4 Drawing Sheets

U.S. PATENT DOCUMENTS

| | | |
|---|---|---|
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,785,355 A | 7/1998 | Main |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostreski et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A * | 1/1999 | Walker et al. .................. 705/50 |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |

| | | | | | | | |
|---|---|---|---|---|---|---|---|
| 6,047,327 | A | 4/2000 | Tso et al. | 6,377,810 | B1 | 4/2002 | Geiger et al. |
| 6,052,563 | A | 4/2000 | Macko | 6,380,959 | B1 | 4/2002 | Wang et al. |
| 6,052,735 | A | 4/2000 | Ulrich et al. | 6,389,455 | B1 | 5/2002 | Fuisz |
| 6,057,855 | A | 5/2000 | Barkans | 6,389,457 | B2 | 5/2002 | Lazaridis et al. |
| 6,065,055 | A | 5/2000 | Hughes et al. | 6,397,057 | B1 | 5/2002 | Malackowski et al. |
| 6,073,138 | A | 6/2000 | de l'Etraz et al. | 6,397,230 | B1 | 5/2002 | Carmel et al. |
| 6,073,142 | A | 6/2000 | Geiger et al. | 6,401,104 | B1 | 6/2002 | LaRue et al. |
| 6,073,165 | A | 6/2000 | Narasimhan et al. | 6,401,112 | B1 | 6/2002 | Boyer et al. |
| 6,085,166 | A | 7/2000 | Beckhardt et al. | 6,401,113 | B2 | 6/2002 | Lazaridis et al. |
| 6,085,192 | A | 7/2000 | Mendez et al. | 6,405,197 | B2 | 6/2002 | Gilmour |
| 6,088,677 | A | 7/2000 | Spurgeon | 6,411,696 | B1 | 6/2002 | Iverson et al. |
| 6,101,320 | A | 8/2000 | Schuetze et al. | 6,415,031 | B1 | 7/2002 | Colligan et al. |
| 6,101,480 | A | 8/2000 | Conmy et al. | 6,418,308 | B1 | 7/2002 | Heinonen et al. |
| 6,101,531 | A | 8/2000 | Eggleston et al. | 6,421,669 | B1 | 7/2002 | Gilmour et al. |
| 6,112,181 | A | 8/2000 | Shear et al. | 6,421,781 | B1 | 7/2002 | Fox et al. |
| 6,119,014 | A | 9/2000 | Alperovich et al. | 6,430,602 | B1 | 8/2002 | Kay et al. |
| 6,119,171 | A | 9/2000 | Alkhatib | 6,438,585 | B2 | 8/2002 | Mousseau et al. |
| 6,125,369 | A | 9/2000 | Wu et al. | 6,438,612 | B1 | 8/2002 | Ylonen et al. |
| 6,125,388 | A | 9/2000 | Reisman | 6,442,589 | B1 | 8/2002 | Takahashi et al. |
| 6,128,627 | A | 10/2000 | Mattis et al. | 6,442,637 | B1 | 8/2002 | Hawkins et al. |
| 6,130,898 | A | 10/2000 | Kostreski et al. | 6,446,118 | B1 | 9/2002 | Gottlieb |
| 6,131,096 | A | 10/2000 | Ng et al. | 6,463,463 | B1 | 10/2002 | Godfrey et al. |
| 6,131,116 | A | 10/2000 | Riggins et al. | 6,463,464 | B1 | 10/2002 | Lazaridis et al. |
| 6,134,432 | A | 10/2000 | Holmes et al. | 6,487,557 | B1 | 11/2002 | Nagatomo |
| 6,138,013 | A | 10/2000 | Blanchard et al. | 6,487,560 | B1 | 11/2002 | LaRue et al. |
| 6,138,124 | A | 10/2000 | Beckhardt | 6,490,353 | B1 | 12/2002 | Tan |
| 6,138,128 | A | 10/2000 | Perkowitz et al. | 6,496,802 | B1 | 12/2002 | van Zoest et al. |
| 6,138,146 | A | 10/2000 | Moon et al. | 6,499,054 | B1 | 12/2002 | Hesselink et al. |
| 6,141,664 | A | 10/2000 | Boothby | 6,505,214 | B1 | 1/2003 | Sherman et al. |
| 6,151,606 | A | 11/2000 | Mendez | 6,516,327 | B1 | 2/2003 | Zondervan et al. |
| 6,157,630 | A | 12/2000 | Adler et al. | 6,526,506 | B1 | 2/2003 | Lewis |
| 6,161,140 | A | 12/2000 | Moriya | 6,529,908 | B1 | 3/2003 | Piett et al. |
| 6,167,379 | A | 12/2000 | Dean et al. | 6,532,446 | B1 | 3/2003 | King |
| 6,167,435 | A | 12/2000 | Druckenmiller et al. | 6,535,892 | B1 | 3/2003 | LaRue et al. |
| 6,170,014 | B1 * | 1/2001 | Darago et al. ............... 709/229 | 6,546,005 | B1 | 4/2003 | Berkley et al. |
| 6,173,312 | B1 | 1/2001 | Atarashi et al. | 6,549,939 | B1 | 4/2003 | Ford et al. |
| 6,173,446 | B1 | 1/2001 | Khan et al. | 6,556,217 | B1 | 4/2003 | Mäkipää et al. |
| 6,175,831 | B1 | 1/2001 | Weinreich et al. | 6,593,944 | B1 | 7/2003 | Nicolas et al. |
| 6,178,419 | B1 | 1/2001 | Legh-Smith et al. | 6,601,026 | B1 | 7/2003 | Appelt et al. |
| 6,181,935 | B1 | 1/2001 | Gossman et al. | 6,615,253 | B1 | 9/2003 | Bowman-Amuah |
| 6,195,533 | B1 | 2/2001 | Tkatch et al. | 6,618,710 | B1 | 9/2003 | Zondervan et al. |
| 6,198,696 | B1 | 3/2001 | Korpi et al. | 6,625,621 | B2 | 9/2003 | Tan et al. |
| 6,198,922 | B1 | 3/2001 | Baynham | 6,636,482 | B2 | 10/2003 | Cloonan et al. |
| 6,201,469 | B1 | 3/2001 | Balch et al. | 6,639,693 | B1 | 10/2003 | Ejiri et al. |
| 6,202,085 | B1 | 3/2001 | Benson et al. | 6,640,097 | B2 | 10/2003 | Corrigan et al. |
| 6,205,448 | B1 | 3/2001 | Kruglikov et al. | 6,640,244 | B1 | 10/2003 | Bowman-Amuah |
| 6,212,529 | B1 | 4/2001 | Boothby et al. | 6,640,249 | B1 | 10/2003 | Bowman-Amuah |
| 6,219,694 | B1 | 4/2001 | Lazaridis et al. | 6,643,650 | B1 | 11/2003 | Slaughter et al. |
| 6,221,877 | B1 | 4/2001 | Aronov et al. | 6,643,688 | B1 | 11/2003 | Fuisz |
| 6,223,187 | B1 | 4/2001 | Boothby et al. | 6,647,384 | B2 | 11/2003 | Gilmour |
| 6,226,686 | B1 | 5/2001 | Rothschild et al. | 6,650,890 | B1 | 11/2003 | Irlam et al. |
| 6,233,341 | B1 | 5/2001 | Riggins | 6,662,016 | B1 | 12/2003 | Buckham et al. |
| 6,243,705 | B1 | 6/2001 | Kucala | 6,668,046 | B1 | 12/2003 | Albal |
| 6,246,875 | B1 | 6/2001 | Seazholtz et al. | 6,671,695 | B2 | 12/2003 | McFadden |
| 6,247,135 | B1 | 6/2001 | Feague | 6,671,700 | B1 | 12/2003 | Creemer et al. |
| 6,249,808 | B1 | 6/2001 | Seshadri | 6,671,702 | B2 | 12/2003 | Kruglikov et al. |
| 6,256,666 | B1 | 7/2001 | Singhal | 6,671,757 | B1 | 12/2003 | Multer et al. |
| 6,263,201 | B1 | 7/2001 | Hashimoto et al. | 6,694,336 | B1 | 2/2004 | Multer et al. |
| 6,263,340 | B1 | 7/2001 | Green | 6,697,807 | B2 | 2/2004 | McGeachie |
| 6,269,369 | B1 | 7/2001 | Robertson | 6,701,378 | B1 | 3/2004 | Gilhuly et al. |
| 6,272,545 | B1 | 8/2001 | Flanagin et al. | 6,707,801 | B2 | 3/2004 | Hsu |
| 6,275,850 | B1 | 8/2001 | Beyda et al. | 6,708,221 | B1 | 3/2004 | Mendez et al. |
| 6,289,212 | B1 | 9/2001 | Stein et al. | 6,714,965 | B2 | 3/2004 | Kakuta et al. |
| 6,292,904 | B1 | 9/2001 | Broomhall et al. | 6,721,787 | B1 | 4/2004 | Hiscock |
| 6,295,541 | B1 | 9/2001 | Bodnar et al. | 6,727,917 | B1 | 4/2004 | Chew et al. |
| 6,300,947 | B1 | 10/2001 | Kanevsky | 6,728,530 | B1 | 4/2004 | Heinonen et al. |
| 6,304,881 | B1 | 10/2001 | Halim et al. | 6,728,786 | B1 | 4/2004 | Hawkins et al. |
| 6,308,201 | B1 | 10/2001 | Pivowar et al. | 6,732,101 | B1 | 5/2004 | Cook |
| 6,317,594 | B1 | 11/2001 | Gossman et al. | 6,732,158 | B1 | 5/2004 | Hesselink et al. |
| 6,320,943 | B1 | 11/2001 | Borland | 6,735,591 | B2 | 5/2004 | Khan |
| 6,324,541 | B1 | 11/2001 | de l'Etraz et al. | 6,741,232 | B1 | 5/2004 | Siedlikowski et al. |
| 6,324,542 | B1 | 11/2001 | Wright, Jr. et al. | 6,741,855 | B1 | 5/2004 | Martin et al. |
| 6,324,544 | B1 | 11/2001 | Alam et al. | 6,742,015 | B1 | 5/2004 | Bowman-Amuah |
| 6,324,587 | B1 | 11/2001 | Trenbeath et al. | 6,745,024 | B1 | 6/2004 | DeJaco et al. |
| 6,327,586 | B1 | 12/2001 | Kisiel | 6,745,326 | B1 | 6/2004 | Wary |
| 6,336,117 | B1 | 1/2002 | Massarani | 6,756,882 | B2 | 6/2004 | Benes et al. |
| 6,356,937 | B1 | 3/2002 | Montville et al. | 6,757,362 | B1 | 6/2004 | Cooper et al. |
| 6,363,352 | B1 | 3/2002 | Dailey et al. | 6,757,696 | B2 | 6/2004 | Multer et al. |
| 6,370,566 | B2 | 4/2002 | Discolo et al. | 6,760,916 | B2 | 7/2004 | Holtz et al. |

| Patent | Date | Inventor |
|---|---|---|
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,873,688 B1 | 3/2005 | Aarnio |
| 6,879,985 B2 | 4/2005 | Deguchi et al. |
| 6,886,030 B1 | 4/2005 | Easterbrook |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,047 B2 | 12/2005 | Hanson et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,194,273 B2 | 3/2007 | Vaudreuil |
| 7,200,390 B2 | 4/2007 | Henager et al. |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B2 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,573 B2 | 3/2009 | Tanabata et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,567,575 B2 | 7/2009 | Chen et al. |
| 7,574,208 B2 | 8/2009 | Hanson et al. |
| 7,575,171 B2 | 8/2009 | Lev |
| 7,587,482 B2 | 9/2009 | Henderson et al. |
| 7,596,608 B2 | 9/2009 | Alexander et al. |
| 7,643,818 B2 | 1/2010 | Backholm et al. |
| 7,680,281 B2 | 3/2010 | Fiatal et al. |
| 7,689,664 B2 | 3/2010 | Karlberg |
| 7,706,781 B2 | 4/2010 | Backholm et al. |
| 7,752,633 B1 | 7/2010 | Fleming |
| 7,769,395 B2 | 8/2010 | Fiatal et al. |
| 7,769,400 B2 | 8/2010 | Backholm et al. |
| 7,796,742 B1 | 9/2010 | Sutaria et al. |
| 7,797,064 B2 | 9/2010 | Loomis et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,917,505 B2 | 3/2011 | Gent et al. |
| 2001/0010046 A1 | 7/2001 | Muyres et al. |
| 2001/0023414 A1 | 9/2001 | Kumar et al. |
| 2001/0032254 A1 | 10/2001 | Hawkins |
| 2001/0034225 A1 | 10/2001 | Gupte |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2002/0002478 A1 | 1/2002 | Swart et al. |
| 2002/0007303 A1 | 1/2002 | Brookler et al. |

| | | | | | |
|---|---|---|---|---|---|
| 2002/0013727 A1 | 1/2002 | Lee | 2003/0211845 A1 | 11/2003 | Lohtia et al. |
| 2002/0019225 A1 | 2/2002 | Miyashita | 2003/0217098 A1 | 11/2003 | Bobde et al. |
| 2002/0019812 A1 | 2/2002 | Board et al. | 2003/0217142 A1 | 11/2003 | Bobde et al. |
| 2002/0035556 A1 | 3/2002 | Shah et al. | 2003/0223554 A1 | 12/2003 | Zhang |
| 2002/0035617 A1 | 3/2002 | Lynch et al. | 2003/0227745 A1 | 12/2003 | Khoo |
| 2002/0038253 A1 | 3/2002 | Seaman et al. | 2003/0235308 A1 | 12/2003 | Boynton et al. |
| 2002/0042875 A1 | 4/2002 | Shukla | 2003/0236981 A1 | 12/2003 | Marmigere et al. |
| 2002/0049828 A1 | 4/2002 | Pekarek-Kostka | 2004/0002324 A1 | 1/2004 | Juntunen et al. |
| 2002/0053078 A1 | 5/2002 | Holtz et al. | 2004/0006630 A1 | 1/2004 | Friend et al. |
| 2002/0055351 A1 | 5/2002 | Elsey et al. | 2004/0024795 A1 | 2/2004 | Hind et al. |
| 2002/0059201 A1 | 5/2002 | Work | 2004/0024892 A1 | 2/2004 | Creswell et al. |
| 2002/0059457 A1 | 5/2002 | Ballard et al. | 2004/0027326 A1 | 2/2004 | Hays et al. |
| 2002/0068559 A1 | 6/2002 | Sharma et al. | 2004/0027375 A1 | 2/2004 | Ellis et al. |
| 2002/0077077 A1 | 6/2002 | Rezvani et al. | 2004/0027378 A1 | 2/2004 | Hays et al. |
| 2002/0077084 A1 | 6/2002 | Zellner et al. | 2004/0043770 A1 | 3/2004 | Amit et al. |
| 2002/0078384 A1 | 6/2002 | Hippelainen | 2004/0049599 A1 | 3/2004 | Friend et al. |
| 2002/0087679 A1 | 7/2002 | Pulley et al. | 2004/0051715 A1 | 3/2004 | Brokenshire et al. |
| 2002/0089542 A1 | 7/2002 | Imamura | 2004/0054739 A1 | 3/2004 | Friend et al. |
| 2002/0091921 A1 | 7/2002 | Kunzinger | 2004/0064445 A1 | 4/2004 | Pfleging et al. |
| 2002/0095319 A1 | 7/2002 | Swart et al. | 2004/0064488 A1 | 4/2004 | Sinha |
| 2002/0095328 A1 | 7/2002 | Swart et al. | 2004/0068698 A1 | 4/2004 | Wu et al. |
| 2002/0095391 A1 | 7/2002 | Swart et al. | 2004/0075675 A1 | 4/2004 | Raivisto et al. |
| 2002/0095399 A1 | 7/2002 | Devine et al. | 2004/0075695 A1 | 4/2004 | Chew et al. |
| 2002/0098855 A1 | 7/2002 | Hartmaier et al. | 2004/0078814 A1 | 4/2004 | Allen |
| 2002/0099613 A1 | 7/2002 | Swart et al. | 2004/0080515 A1 | 4/2004 | Hagiwara |
| 2002/0101975 A1 | 8/2002 | Tiburtius et al. | 2004/0082346 A1 | 4/2004 | Skytt |
| 2002/0116499 A1 | 8/2002 | Enns et al. | 2004/0098625 A1 | 5/2004 | Lagadec et al. |
| 2002/0116501 A1 | 8/2002 | Ho et al. | 2004/0103147 A1 | 5/2004 | Flesher et al. |
| 2002/0120766 A1 | 8/2002 | Okajima et al. | 2004/0120323 A1 | 6/2004 | Viikari et al. |
| 2002/0120779 A1 | 8/2002 | Teeple et al. | 2004/0128375 A1 | 7/2004 | Rockwell |
| 2002/0126701 A1 | 9/2002 | Requena | 2004/0133626 A1 | 7/2004 | Herrero et al. |
| 2002/0133504 A1 | 9/2002 | Vlahos et al. | 2004/0141011 A1 | 7/2004 | Smethers et al. |
| 2002/0144109 A1 | 10/2002 | Benantar et al. | 2004/0147262 A1 | 7/2004 | Lescuyer et al. |
| 2002/0146129 A1 | 10/2002 | Kaplan | 2004/0158611 A1 | 8/2004 | Daniell et al. |
| 2002/0152379 A1 | 10/2002 | Gefwert et al. | 2004/0167966 A1 | 8/2004 | Lee et al. |
| 2002/0155848 A1 | 10/2002 | Suryanarayana | 2004/0170257 A1 | 9/2004 | Gross et al. |
| 2002/0158908 A1 | 10/2002 | Vaajala et al. | 2004/0172481 A1 | 9/2004 | Engstrom |
| 2002/0161587 A1 | 10/2002 | Pitts, III et al. | 2004/0176128 A1 | 9/2004 | Grabelsky et al. |
| 2002/0161925 A1 | 10/2002 | Munger et al. | 2004/0179513 A1 | 9/2004 | Smith et al. |
| 2002/0161928 A1 | 10/2002 | Ndili | 2004/0181550 A1 | 9/2004 | Warsta et al. |
| 2002/0164977 A1 | 11/2002 | Link II et al. | 2004/0186902 A1 | 9/2004 | Stewart |
| 2002/0186848 A1 | 12/2002 | Shaik | 2004/0189610 A1 | 9/2004 | Friend |
| 2002/0188940 A1 | 12/2002 | Breckner et al. | 2004/0199497 A1 | 10/2004 | Timmons |
| 2002/0193094 A1 | 12/2002 | Lawless et al. | 2004/0199582 A1 | 10/2004 | Kucharewski et al. |
| 2002/0194209 A1 | 12/2002 | Bolosky et al. | 2004/0205248 A1 | 10/2004 | Little et al. |
| 2002/0198027 A1 | 12/2002 | Rydbeck | 2004/0205330 A1 | 10/2004 | Godfrey et al. |
| 2003/0005151 A1 | 1/2003 | Ullman et al. | 2004/0209602 A1 | 10/2004 | Joyce et al. |
| 2003/0022662 A1 | 1/2003 | Mittal | 2004/0230619 A1 | 11/2004 | Blanco et al. |
| 2003/0023975 A1 | 1/2003 | Schrader et al. | 2004/0236792 A1 | 11/2004 | Celik |
| 2003/0028430 A1 | 2/2003 | Zimmerman | 2004/0252816 A1 | 12/2004 | Nicolas |
| 2003/0028441 A1 | 2/2003 | Barsness et al. | 2004/0255126 A1 | 12/2004 | Reith |
| 2003/0054810 A1 | 3/2003 | Chen et al. | 2004/0258231 A1 | 12/2004 | Elsey et al. |
| 2003/0056096 A1 | 3/2003 | Albert et al. | 2004/0259535 A1 | 12/2004 | Elsey et al. |
| 2003/0060188 A1 | 3/2003 | Gidron et al. | 2004/0266364 A1 | 12/2004 | Nguyen et al. |
| 2003/0063120 A1 | 4/2003 | Wong et al. | 2004/0268148 A1* | 12/2004 | Karjala et al. ................ 713/201 |
| 2003/0065738 A1 | 4/2003 | Yang et al. | 2005/0002501 A1 | 1/2005 | Elsey et al. |
| 2003/0065802 A1 | 4/2003 | Vitikainen et al. | 2005/0002508 A1 | 1/2005 | Elsey et al. |
| 2003/0070061 A1 | 4/2003 | Wong et al. | 2005/0002509 A1 | 1/2005 | Elsey et al. |
| 2003/0072451 A1 | 4/2003 | Pimentel et al. | 2005/0002510 A1 | 1/2005 | Elsey et al. |
| 2003/0078880 A1 | 4/2003 | Alley et al. | 2005/0010694 A1* | 1/2005 | Ma et al. ....................... 709/250 |
| 2003/0084165 A1 | 5/2003 | Kjellberg | 2005/0015432 A1 | 1/2005 | Cohen |
| 2003/0088629 A1 | 5/2003 | Berkowitz et al. | 2005/0021750 A1 | 1/2005 | Abrams |
| 2003/0093691 A1 | 5/2003 | Simon et al. | 2005/0022182 A1 | 1/2005 | Mittal |
| 2003/0097381 A1 | 5/2003 | Detweiler et al. | 2005/0027591 A9 | 2/2005 | Gailey et al. |
| 2003/0100321 A1 | 5/2003 | Rao et al. | 2005/0027716 A1 | 2/2005 | Apfel |
| 2003/0100326 A1 | 5/2003 | Grube et al. | 2005/0033812 A1 | 2/2005 | McCarthy et al. |
| 2003/0117432 A1 | 6/2003 | Kautto-Kiovula et al. | 2005/0038707 A1 | 2/2005 | Roever et al. |
| 2003/0125023 A1 | 7/2003 | Fishler | 2005/0038724 A1 | 2/2005 | Roever et al. |
| 2003/0126216 A1 | 7/2003 | Avila et al. | 2005/0038863 A1 | 2/2005 | Onyon et al. |
| 2003/0130984 A1 | 7/2003 | Quinlan et al. | 2005/0041793 A1 | 2/2005 | Fulton et al. |
| 2003/0146934 A1 | 8/2003 | Bailey et al. | 2005/0044144 A1 | 2/2005 | Malik et al. |
| 2003/0153338 A1 | 8/2003 | Herz et al. | 2005/0055578 A1* | 3/2005 | Wright et al. ................ 713/201 |
| 2003/0154212 A1 | 8/2003 | Schirmer et al. | 2005/0063544 A1 | 3/2005 | Uusitalo et al. |
| 2003/0156146 A1 | 8/2003 | Suomela et al. | 2005/0071674 A1 | 3/2005 | Chou et al. |
| 2003/0157947 A1 | 8/2003 | Fiatal et al. | 2005/0076136 A1 | 4/2005 | Cho et al. |
| 2003/0169262 A1 | 9/2003 | Lavelle et al. | 2005/0086540 A1 | 4/2005 | Gunter et al. |
| 2003/0177281 A1 | 9/2003 | McQuillan et al. | 2005/0094625 A1 | 5/2005 | Bouat |
| 2003/0208529 A1 | 11/2003 | Pendyala et al. | 2005/0097225 A1 | 5/2005 | Glatt et al. |
| 2003/0208559 A1 | 11/2003 | Velline et al. | 2005/0097570 A1 | 5/2005 | Bomers |

| Publication No. | Date | Inventor |
|---|---|---|
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154796 A1 | 7/2005 | Forsyth |
| 2005/0155027 A1 | 7/2005 | Wei |
| 2005/0164721 A1 | 7/2005 | Eric Yeh et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0203966 A1 | 9/2005 | Labrou et al. |
| 2005/0210104 A1 | 9/2005 | Torvinen |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little, II |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0020525 A1* | 1/2006 | Borelli et al. ............ 705/34 |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0063544 A1 | 3/2006 | Zhao et al. |
| 2006/0069686 A1 | 3/2006 | Beyda et al. |
| 2006/0069687 A1 | 3/2006 | Cui |
| 2006/0073810 A1 | 4/2006 | Pyhalammi et al. |
| 2006/0074951 A1 | 4/2006 | Beier et al. |
| 2006/0084410 A1 | 4/2006 | Sutaria et al. |
| 2006/0085503 A1 | 4/2006 | Stoye et al. |
| 2006/0093135 A1 | 5/2006 | Fiatal et al. |
| 2006/0099969 A1 | 5/2006 | Staton et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0165226 A1 | 7/2006 | Ernst et al. |
| 2006/0168043 A1 | 7/2006 | Eisenberger et al. |
| 2006/0168164 A1* | 7/2006 | Lemson et al. ............ 709/221 |
| 2006/0179410 A1 | 8/2006 | Deeds |
| 2006/0188864 A1 | 8/2006 | Shah |
| 2006/0190428 A1 | 8/2006 | Jung et al. |
| 2006/0190984 A1* | 8/2006 | Heard et al. ............ 726/1 |
| 2006/0192014 A1 | 8/2006 | Hamilton et al. |
| 2006/0195570 A1 | 8/2006 | Zellner et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242210 A1 | 10/2006 | Ring et al. |
| 2006/0242607 A1 | 10/2006 | Hudson |
| 2006/0252435 A1 | 11/2006 | Henderson et al. |
| 2006/0265595 A1 | 11/2006 | Scottodiluzio |
| 2006/0277265 A1 | 12/2006 | Backholm et al. |
| 2006/0294071 A1 | 12/2006 | Weare et al. |
| 2007/0005738 A1 | 1/2007 | Alexion-Tiernan et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067381 A1 | 3/2007 | Grant et al. |
| 2007/0067424 A1 | 3/2007 | Raciborski et al. |
| 2007/0078857 A1 | 4/2007 | Punaganti et al. |
| 2007/0105627 A1 | 5/2007 | Campbell |
| 2007/0116223 A1 | 5/2007 | Burke et al. |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0156824 A1 | 7/2007 | Thompson |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | La Joie et al. |
| 2007/0276926 A1 | 11/2007 | LaJoie et al. |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0294295 A1 | 12/2007 | Finkelstein et al. |
| 2008/0001717 A1 | 1/2008 | Fiatal |
| 2008/0009344 A1 | 1/2008 | Graham et al. |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0077506 A1 | 3/2008 | Rampell et al. |
| 2008/0077571 A1 | 3/2008 | Harris et al. |
| 2008/0086379 A1 | 4/2008 | Dion et al. |
| 2008/0103877 A1 | 5/2008 | Gerken |
| 2008/0125225 A1 | 5/2008 | Lazaridis et al. |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0192820 A1 | 8/2008 | Brooks et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0270379 A1 | 10/2008 | Ramakrishna |
| 2008/0298386 A1 | 12/2008 | Fiatal |
| 2008/0313282 A1 | 12/2008 | Warila et al. |
| 2009/0012841 A1 | 1/2009 | Saft et al. |
| 2009/0016526 A1 | 1/2009 | Fiatal et al. |
| 2009/0031006 A1 | 1/2009 | Johnson |
| 2009/0054034 A1 | 2/2009 | Backholm et al. |
| 2009/0063647 A1 | 3/2009 | Backholm et al. |

| | | | |
|---|---|---|---|
| 2009/0075683 | A1 | 3/2009 | Backholm et al. |
| 2009/0110179 | A1 | 4/2009 | Elsey et al. |
| 2009/0119266 | A1 | 5/2009 | Fitzpatrick et al. |
| 2009/0125523 | A1 | 5/2009 | Fitzpatrick et al. |
| 2009/0144632 | A1 | 6/2009 | Mendez |
| 2009/0149203 | A1 | 6/2009 | Backholm et al. |
| 2009/0156178 | A1 | 6/2009 | Elsey et al. |
| 2009/0157792 | A1 | 6/2009 | Fiatal |
| 2009/0164560 | A1 | 6/2009 | Fiatal |
| 2009/0172565 | A1 | 7/2009 | Jackson et al. |
| 2009/0181641 | A1 | 7/2009 | Fiatal |
| 2009/0182500 | A1 | 7/2009 | Dicke |
| 2009/0191903 | A1 | 7/2009 | Fiatal |
| 2009/0193130 | A1 | 7/2009 | Fiatal |
| 2009/0193338 | A1 | 7/2009 | Fiatal |
| 2009/0221326 | A1 | 9/2009 | Roussel et al. |
| 2009/0241180 | A1 | 9/2009 | Fiatal |
| 2009/0248670 | A1 | 10/2009 | Fiatal |
| 2009/0248794 | A1 | 10/2009 | Helms et al. |
| 2009/0299817 | A1 | 12/2009 | Fok et al. |
| 2009/0307133 | A1 | 12/2009 | Holloway et al. |
| 2009/0318171 | A1 | 12/2009 | Backholm et al. |
| 2009/0323678 | A1* | 12/2009 | Wang ............................ 370/352 |
| 2009/0325565 | A1 | 12/2009 | Backholm |
| 2010/0057924 | A1 | 3/2010 | Rauber et al. |
| 2010/0146107 | A1 | 6/2010 | Fiatal |
| 2010/0174735 | A1 | 7/2010 | Fiatal |

FOREIGN PATENT DOCUMENTS

| | | |
|---|---|---|
| EP | 1422899 A1 | 5/2004 |
| EP | 1466261 A1 | 10/2004 |
| EP | 1466435 A1 | 10/2004 |
| EP | 1815634 A1 | 8/2007 |
| EP | 1815652 A1 | 8/2007 |
| EP | 1817883 A1 | 8/2007 |
| FI | 117152 B | 6/2006 |
| FI | 118288 B | 9/2007 |
| FI | 119581 B | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 T | 5/2005 |
| JP | 4386732 B2 | 10/2009 |
| WO | WO 1997/041661 A2 | 11/1997 |
| WO | 9824257 | 6/1998 |
| WO | WO 1998/058322 A2 | 12/1998 |
| WO | 0130130 A2 | 5/2001 |
| WO | WO 2003/007570 A1 | 1/2003 |
| WO | WO 2003/058483 A1 | 7/2003 |
| WO | WO 2003/058879 A1 | 7/2003 |
| WO | 03098890 A1 | 11/2003 |
| WO | 2004045171 A1 | 5/2004 |
| WO | 2005015925 A2 | 2/2005 |
| WO | 2005020108 A1 | 3/2005 |
| WO | WO 2006/045005 A1 | 4/2006 |
| WO | WO 2006/045102 A2 | 4/2006 |
| WO | WO 2006/053952 A1 | 5/2006 |
| WO | WO 2006/053954 A1 | 5/2006 |
| WO | WO 2006/058967 A1 | 6/2006 |
| WO | WO 2007/015725 A2 | 2/2007 |
| WO | WO 2007/015726 A1 | 2/2007 |
| WO | WO 2007/149526 A2 | 12/2007 |
| WO | WO 2007/149540 A2 | 12/2007 |

OTHER PUBLICATIONS

Lotus Development Corporation, Lotus Notes Release 3.1. The Groupware Standard, Administrator's Guide-Server for NetWare, OS/2 and UNIX, 1989.
Lotus Development Corporation, Lotus Notes Release 3.1. The Groupware Standard, Site and Systems Planning Guide, 1991.
Wilcox, Adam A., PC Learning Labs Teaches Lotus Notes 3.0: The Quick and Easy Way to Learn Ziff-Davis Press, 1993.
Lotus Development Corporation, Lotus Notes Release 3.3: Start Here, Workstation Install for Windows, OS/2 and Macintosh, 1993.
Lotus Development Corporation, Lotus Notes Release 3.1: Administrator's Guid- Server for Windows, 1993.
Lotus Development Corporation, Lotus Notes Release 3.1: The GroupWare Standard, Customer Services Application Guide, 1994.
Lotus Development Corporation, Lotus Notes Release 3.1: The GroupWare Standard, Getting Started with Application Development, 1994.
Lotus Development Corporation, Lotus Notes Release 3.1: The GroupWare Standard, Network Driver Documentation, 1994.
Kornblith, Polly R., Lotus Notes Answers: Certified Tech Support, Covers Lotus Notes Release 3, Osborne McGraw-Hill, 1994.
Freeland, Pat and Londergan, Stephen, Lotus Notes 3/3.1 for Dummies TM, IDG Books Worldwide, 1994.
Gewirtz, David, Lotus Notes 3 Revealed! Your Guide to Managing Information and Improving Communication Throughout Your Organization, Prima Publishing, 1994.
Shafran, Andrew B., Easy Lotus Notes for Windows™, QueÒ Corporation, 1994.
Lotus Development Corporation, Lotus Notes Release 3.3: The Groupware Standard, Administration, 1994.
McMullen, Melanie, Editor, Network Remote Access and Mobile Computing, Miller Freeman, Inc., 1994.
Lotus Development Corporation, Lotus Notes: The Groupware Standard-Windows, 1994.
IntelliLink Corporation, IntelliLink® For Windows User's Guide, Version 3.0, 1994.
Lotus Development Corporation, Lotus Notes Release 4: InterNotes Web Navigator Administrator's Guide, 1995.
Lotus Development Corporation, Lotus Notes Release 4 Install Guide for Servers, 1995.
Lotus Development Corporation, Lotus Notes Release 4.1 Release Notes, 1995.
Lotus Development Corporation, Lotus Notes Release 4 Migration Guide, 1995.
Lotus Development Corporation, Lotus Notes Release 4 Database Manager's Guide, 1995.
Lotus Development Corporation, Lotus Notes Release 4 Install Guide for Workstations, 1995.
Lotus Development Corporation, Lotus Step by Step: A Beginner's Guide to Lotus Notes, 1995.
Lotus Development Corporation, Lotus Notes Release 4 Programmer's Guide Part 1, 1995.
Lotus Development Corporation, Lotus Notes Release 4 Programmer's Guide Part 2, 1995.
Lotus Development Corporation, Lotus Notes Release 4 Administrator's Guide, 1995.
Lotus Development Corporation, Lotus Notes Release 4 Deployment Guide, 1995.
Lotus Development Corporation, Lotus Notes Release 4 Application Developer's Guide, 1995.
Lotus Development Corporation, Lotus Notes Release 4 InterNotes Web Navigator User's Guide, 1995.
Lotus Development Corporation, Lotus Notes Release 4 Release Notes, 1995.
Lotus Development Corporation, Lotus Notes Release 4.5 Install Guide for Workstations, 1995.
Lotus Development Corporation, Release Notes, Lotus Notes Release 3.30, Windows, OS/2, and Macintosh, 1995.
Brown, Kevin, et al., Mastering LotusÒ NotesÒ, SYBEX Inc., 1995.
Lotus Development Corporation, Lotus Notes Release 4.5, Network Configuration Guide, 1995.
Netscape Communications Corporation, Installation Guide, Netscape Mail Server, Version 2.0 for Unix, 1995.
Netscape Communications Corporation, Administrator's Guide, Netscape Mail Server, Version 2.0, 1995.
Pyle, Hugh, "The Architecture of Lotus Notes", Lotus Notes Advisor, Advisor Publications, Premiere Issue 1995, pp. 18-27.
Lotus Notes Advisor, Advisor Publications, Jun. 1995, entire magazine.
IBM, "The Architecture of Lotus Notes", White Paper, No. 114654, Modified date: May 31, 1995.
Lotus Development Corporation, Lotus Notes Knowledge Base, "What is the Notes Repilcator", Jul. 5, 1995.
Lotus Notes Advisor, Advisor Publications, Aug. 1995, entire magazine.

Grous, Paul J., "Creating and Managing a Web Site with Lotus' InterNotes Web Publisher", The View Technical Journal for Lotus NotesÒ Software, vol. 1, Issue 4, Sep./Oct. 1995, pp. 3-18.

Lotus Notes Advisor, Advisor Publications, Oct. 1995, entire magazine.

Cole, Barb, "Lotus airs Notes-to-database integration tool", www.looksmart.com, Oct. 2, 1995.

Lotus Development Corporation, Lotus Notes Knowledge Base, "Lotus Announces Lotus NotesPump 1.0", Oct. 31, 1995.

Lotus Development Corporation, Lotus Notes Knowledge Base, "Lotus NotesPump 1.0 Q & A", Oct. 31, 1995.

Lotus Development Corporation, Lotus Notes Knowledge Base, "Lotus NotesPump: Database Integration for Lotus Notes", Oct. 31, 1995.

Lotus Development Corporation, Lotus Notes Knowledge Base, "How to Set Up "Firewall" Protection for a Notes Domain", Nov. 6, 1995.

Balaban, Bob, "This is Not Your Father's Basic: LotusScript in Notes Release 4", Lotus Notes Advisor, Advisor Publications, vol. 1, No. 5, Nov./Dec. 1995, pp. 31-58.

Pyle, Lisa, "A Jump Start to the Top Ten R3-to-R4 Migration Considerations", Lotus Notes Advisor, Advisor Publications, vol. 1, No. 5, Nov./Dec. 1995, pp. 3-20.

Lotus Notes Advisor, Advisor Publications, Dec. 1995, entire magazine.

Lotus Development Corporation, Lotus Notes Release 4 Install Guide for Workstations, First Revision, 1996.

Freeland, Pat and Londergan, Stephen, Lotus Notes 4 for Dummies™, IDG Books Worldwide, 1996.

Kreisle, Bill, Teach yourself . . . Lotus Notes 4, MIS: Press, 1996.

Marmel, Elain, Easy LotusÒ Notes Release 4.0, Que Corporation, 1996.

Lotus Development Corporation, Lotus Notes Server Up and Running!, Release 4, 1996.

Falkner, Mike, "How to Plan, Develop, and Implement Lotus Notes in Your Organization", Willy Computer Publishing, John Wiley and Sons, Inc., 1996.

Lamb, John P., et al., "Lotus Notes Network Design", McGraw-Hill, 1996.

Tamura, Randall A., et al., Lotus Notes 4 Unleashed, Sams Publishing, 1996.

Dahl, Andrew, Lotus Notes 4 Administrator's Survival Guide, Sams Publishing, 1996.

Netscape Communications Corporation, Administrator's Guide, Netscape News Server, Version 2.0, 1996.

Lotus Development Corporation, Lotus Notes Internet Cookbook for Notes Release 3, Jan. 16, 1996.

Wong, Harry, "Casahl's Replic-Action: Delivering True Notes/DBMS Integration", The View Technical Journal for Lotus Notes Software, vol. 2, Issue 1, Jan./Feb. 1996, pp. 33-50.

Lotus Notes Advisor, Advisor Publications, Jan./Feb. 1996, entire magazine.

IBM International Technical Support Organization, Lotus Notes Release 4 in a Multiplatform Environment, Feb. 1996.

Lotus Development Corporation, Lotus Notes Internet Cookbook for Notes Release 4, Feb. 14, 1996.

Blaney, Jeff, "You Can Take it with you: An Introduction to Mobile Computing with Notes R4", The View Technical Journal for Lotus Notes Software, vol. 2, Issue 1, Jan./Feb. 1996, pp. 22-32.

Lotus Notes Advisor, Advisor Publications, Apr. 1996, entire magazine.

Frankel, Garry, "Pumping for Info: Notes and Database Integration", Network Computing, May 1, 1996, pp. 76-84.

Lotus Development Corporation, Lotus Notes Knowledge Base, "Firewall Security Overview and How Firewalls Relate to Lotus Notes", May 22, 1996.

Lotus Notes Advisor, Advisor Publications, Jun. 1996, entire magazine. .

Augun, Audry, "Integrating Lotus Notes with Enterprise Data", Lotus Notes Advisor Publications, Jul./Aug. 1996, pp. 22-25.

Lotus Notes Advisor, Advisor Publications, Aug. 1996, entire magazine.

IBM Corporation, Secrets to Running Lotus Notes: The Decisions No One Tells You How to Make, Oct. 1996.

Lotus Notes Advisor, Advisor Publications, Oct. 1996, entire magazine.

Opyt, Barbara, et al., "Use the Internet as Your Lotus Notes WAN", Lotus Notes Advisor, Advisor Publications, Nov./Dec. 1996, pp. 17-20.

Lotus Notes Advisor, Advisor Publications, Dec. 1996, entire magazine.

Swedeen, Bret, et al., "Under the Microscope: Domino Replication", LDD Today, Oct. 1, 1998.

Lotus Development Corporation, Lotus Inside Notes: The Architecture of Notes and the Domino Server, 2000.

"The History of Notes and Domino", Lotus Developer Domain, Lotus, Sep. 29, 2003.

Lotus Development Corporation, Lotus Quick Reference for SmartIcons for Lotus Notes Release 3.1, 1994; 4 pages.

Lotus Development Corporation, Lotus Quick Reference for Windows and Presentation Manager for Lotus Notes Release 3; May, 1993; 6 pages.

Lotus Development Corporation, Lotus Quick Reference for Macintosh for Lotus Notes Release 3; May, 1993; 6 pages.

Lotus Development Corporation, Lotus Quick Reference for Application Developers for Lotus Notes Release 3; May 1993; 6 pages.

Lotus Development Corporation, Lotus Customer Support Services, Lotus Notes Customer Support Guide;1995; 33 pages.

Lotus Development Corporation, Lotus Software Agreement with Lotus Notes 4.0~"Notes 4.0 NA DKTP CLIENT UPG", Part No. 38985; Jan. 1996; 8 pages.

Lotus Development Corporation, Lotus Customer Support~North American Guide; 1996; 8 pages.

Lotus Development Corporation, Lotus NotesPump 1.0 Release Notes; Oct. 1995; 8 pages.

Overview, What is Lotus NotesPump?; 87 pages.

Chapter: "About NotesPump", Release 2.0; Jun. 1996; 480 pages.

Lotus Development Corporation, Lotus Notes 4 Administration Help, screenshots; 1996, 17 pages.

Lotus Development Corporation, LotusScript Classes for Notes Release 4, scans from Part No. JA0476; 1996, 6 pages.

Chapter 13-1, publication unknown, "Anatomy of a Note ID"; Jun. 1996; 8 pages.

Lotus Development Corporation, Lotus Notes 3.3, Lotus Customer Support, North American Guide; 1995; 33 pages.

Lotus Development Corporation, Lotus Notes 4.0, Lotus Customer Support, North American Guide; 1996; 29 pages.

Haas, Zygmunt J. et al., "Mobile-TCP: An Asymmetric Transport Protocol Design for Mobile Systems," IEEE, pp. 1054-1058, 1997.

Haas, Zygmunt J. et al., "The Design and Performance Of Mobile TCP for Wireless Networks," Journal of High Speed Networks, vol. 10, pp. 187-207, 2001.

Hajdu, Kalman et al., "Lotus Notes Release 4 In a Multiplatform Environment," IBM Corporation, 173 pp., Feb. 1996.

Hardy, Ed, "Microsoft Proposes Two New Thumb-Driven User Interfaces," Brighthand Consulting, Inc., 2 pages, 2003.

IBM Corporation, "The Architecture of Lotus Notes," White Paper No. 114654, 26 pages, May 31, 1995.

IBM Corporation, "The History of Notes and Domino," Lotus Developer Domain, 11 pages, Sep. 29, 2003.

ImTOO, "ImTOO iPod Movie Converter," 3 pages, Nov. 9, 2005.

IntelliLink Corporation, "IntelliLink® For Windows User's Guide," Version 3.0, 167 pages, 1994.

International Application No. PCT/US2003/000618, International Search Report, 1 page, Apr. 4, 2003.

International Application No. PCT/US2003/000624, International Search Report, 2 pages, May 13, 2003.

International Application No. PCT/US2005/037702, International Preliminary Examination Report, 6 pages, Nov. 20, 2007.

International Application No. PCT/US2005/037702, International Search Report, 1 p., Nov. 5, 2007.

International Application No. PCT/US2005/037702, Written Opinion, 6 pages, Nov. 5, 2007.

International Application No. PCT/US2005/038135, International Search Report, 2 pages, Aug. 8, 2008.

International Application No. PCT/US2005/038135, Written Opinion, 8 pages, Aug. 8, 2008.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens And LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99/1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself. . .Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection For A Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration For Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server For NetWare, OS-2, And Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Date Unknown—published prior to Jan. 8, 2003.
Lotus Development Corporation, "Lotus Notes Customer Support Guide—North American Guide," Release 4.1, 51 pages, Date Unknown—published prior to Jan. 8, 2003.
Lotus Development Corporation, "Lotus Notes Database Manager's Guide," Release 4, 115 pages, 1995.

Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Cprporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Date Unknown—published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide - Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Date Unknown—published prior to Jan. 8, 2003.
Lotus Development Corporation, "Lotus Notes Quick Reference for Macintosh," Release 3, 6 pages, Date Unknown—published prior to Jan. 8, 2003.
Lotus Development Corporation, "Lotus Notes Quick Reference for SmartIcons," Release 3.1, 4 pates, Date Unknown~published prior to Jan. 8, 2003.
Lotus Development Corporation, "Lotus Notes Quick Reference for Windows and Presentation Manager," Release 3, 6 pages, Date Unknown~published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site And Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Date Unknown~published prior to Jan. 8, 2003.
Lotus Development Corporation, "What Is The Notes Replicator?," Lotus Notes Knowledge Base, 8 pages, Jul. 5, 1995.
"Lotus Notes Advisor," Advisor Publications Inc., 55 pages, Jun. 1995.

"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes - Notes Administration Help," Screen Shots, 17 pages, Date Unknown~published prior to Jan. 8, 2003.
MacGregor, Rob et al., "The Domino Defense: Security In Lotus Notes And The Internet," IBM Corporation, 183 pages, Dec. 1997.
Maltz, David A. et al., "MSOCKS: An Architecture For Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is in," TechRepublic, 4 pages, Apr. 4, 2001.
McMullen, Melanie, "Network Remote Access And Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves In Cryptography," Advances In Cryptology—CRYPTO '85 Proceedings, vol. 218, pp. 417-426, 1985.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad a. et al., "User Interfaces That Span Hand-Held And Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide For Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Date Unknown~published prior to Jan. 8, 2003.
Opyt, Barbara et al., "Use The Internet As Your Lotus Notes WAN," Lotus Notes Advisor, pp. 17-20, Nov.-Dec. 1996.
Ortiz, C. Enrique, "An Introduction To The Symbian Os™ Platform for Palm OS® Developers," Metrowerks Corp., 21 pages, 2002.
"Overview~What Is Lotus NotesPump?," Publication Unknown, 88 pages, Date Unknown~published prior to Jan. 8, 2003.
Phillips, Joshua et al., "Modeling The Intelligence Analysis Process For Intelligent User Agent Development," Research and Practice in Human Resource Management, vol. 9, No. 1, pp. 5973, 2001.
Pyle, Hugh, "The Architecture Of Lotus Notes," Lotus Notes Advisor, Premiere Issue, pp. 18-27, 1995.
Pyle, Lisa, "A Jump Start To The Top Ten R3-To-R4 Migration Considerations," The View, vol. 1, Issue 5, 22 pages, Nov.-Dec. 1995.
Ringel, Meredith et al., "iStuff: A Scalable Architecture For Lightweight, Wireless Devices for Ubicomp User Interfaces," Proceedings of UbiComp 2002, 2 pages, 2002.
Shafran, Andrew Bryce, "Easy Lotus Notes® for Windows™," Que Corporation, 199 pages, 1994.
Signorini, Eugene, "SEVEN's Service-Based Wireless Solutions Enable Enterprises To Untether E-Mail, " Wireless/Mobile Enterprise & Commerce, 16 pages, Oct. 2004.
Swedeen, Bret et al., "Under the Microscope~Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies In Support of Opportunistic Collaboration," CoopIS/DOA/ODBASE 2003, LNCS 2888, pp. 162-177, 2003.
Wainwright, Andrew, "Secrets To Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.
Lotus Development Corporation, "Lotus Notes Customer Support Guide~North American Guide," Release 4.1, 51 pages, Date Unknown~published prior to Jan. 8, 2003.

* cited by examiner

MULTIPLE DATA STORE AUTHENTICATION

CROSS-REFERENCE TO RELATED APPLICATIONS

This application is a continuation of U.S. patent application Ser. No. 11/112,690 filed Apr. 21, 2005 and entitled "Systems and Methods for Simplified Provisioning," the disclosure of which is incorporated herein by reference.

BACKGROUND OF THE INVENTION

1. Field of the Invention

The present invention relates generally to service activation, and more particularly to systems and methods for simplified provisioning and multiple data store authentication.

2. Description of Related Art

Conventionally, a user purchasing services associated with a device needs to register with a service provider to provide specific information about the user. The service provider often has a customer service center that assists the user with registration for various services associated with the wireless device. For instance, the customer service center can record personal information about the user in order to provide wireless Internet services. The service provider typically requires billing information from the user in order to identify the user and collect monies from the user for the services being provided.

When the user activates various services, the service provider may program various databases with the user's personal information, as well as information associated with the device the user is using to access the services. This process may be referred to as "provisioning." Often, the user spends time on the phone with a representative of the service provider in order to provide the information the service provider requires in order to program the various databases. Alternatively, the user may spend time on a device associated with the user in order to provide the requisite information for the provisioning. In exchange for providing the information to the service provider, the user obtains access to certain resources made available by the service provider.

Collecting the user's personal information and storing the information in the databases is frequently done in order to maintain security and ensure that each user pays for the resources being requested. However, users often resent the time it takes to register for access to the resources. Further, users may register many times with the same service provider for different resources available via the service provider. Numerous minutes or hours spent entering information required by the service provider may deter users from subscribing to the various resources offered by the service provider. There is, therefore, a need for a system and method for simplified provisioning.

SUMMARY OF THE INVENTION

An exemplary embodiment of the present invention provides a system for authenticating access to multiple data stores. The exemplary embodiment may include a server, which is coupled to a network. A client device may communicate with the server via the network. Various client devices may be used in this embodiment including cellular telephones, personal digital assistants, or a personal computer. The server may be configured to authenticate access to a plurality of data stores coupled to the server. As a result of authentication, the server may access and forward information at the data stores to the client. In one example, the data stores may be associated with an electronic mail server provider.

Authentication to the plurality of data stores may occur by utilizing data provided to the server by the client device. Authentication may also occur by comparing the data provided to the server by the client device with information at the plurality of data stores, which may have been provided by the client device during a previous authentication encounter.

In some embodiments, the server may be further configured to authenticate the client device prior to the server authenticating access to the plurality of data stores. Authentication of the client device may, for example, include the user of information identifying the client device or a token, which comprises a unique string of data. Alternatively, the server may be further configured to authenticate a user of the client prior to the server authenticating access to the plurality of data stores. Authentication may include use of a user name or a user name in further combination with a password.

In another exemplary embodiment of the present invention, a computing device for authenticating access to multiple data stores is provided. The computing device may include a communications interface for exchanging information over a network; an identification module for identifying a client device or user thereof based on information provided by the client device; and a registration module for accessing multiple data stores and authenticating access to the multiple data stores by the client device or user thereof. The communications interface may also receive information from the multiple data stores following authentication and may further forward received information to the client device.

The identification module of the computing device may identify the client device based on a client identifier. The client identifier may include a unique string of data (a token), which may have been previously assigned to the client device by the identification module. The client identifier, in another embodiment, may include a telephone number or, alternatively, a user name associated with a user of the device.

The identification module, in some embodiments of the present invention, may compare the aforementioned client identifier with information at one or more of the multiple data stores. The information at the multiple data stores may include information provided by the client device during a previous authentication operation. The registration module may also query the user of the client device for information required for accessing the multiple data stores if that information is not currently present.

An exemplary embodiment of the present invention provides a method for authenticating access to multiple data stores. In the exemplary method, a request is received from a client device to access a data store. Information associated with accessing the data store is stored and an identifier is assigned to the client device, that identifier being associated with the stored information. When a subsequent request for access to the data store is received, a query is made with respect to the identifier and if the identifier corresponds to the stored information for accessing the aforementioned data store, the data store is accessed.

In another embodiment of the aforementioned method, a client device may request access to a second data store. Information associated with accessing the second data store may be stored and further associated with the identifier initially associated with information concerning the access of the first data store. Upon receipt of a subsequent request for access to the second data store, if the assigned identifier corresponds to the information associated with accessing the second data store, access is granted to that data store. The information accessed at the first and second data store may be forwarded to the client device. That information may be electronic mail.

In yet another exemplary method for authenticating access to multiple data stores, a client device request for access to a data store is received. The client device may then be queried for an identifier associated with stored information for accessing the data store. If the assigned identifier corresponds to the information associated with accessing the data store, then the store may be accessed. The method may further include the steps of accessing a further data store if the assigned identifier corresponds to information associated with accessing the further data store. The information at the data stores may then be forwarded to the client device. The information may be electronic-mail.

An embodiment of the present invention provides for a computer-readable medium having embodied thereon a program executable by a processor to perform a method for authenticating access to multiple data stores. The method may include receiving a client device request for access to a data store; storing information associated with accessing the data store; assigning an identifier to the client device, wherein the identifier is associated with the stored information for accessing the data store; receiving a subsequent request for access to the data store; querying the client device for the assigned identifier; and accessing the data store if the assigned identifier corresponds to the information associated with accessing the data store.

The computer-readable medium may further include a program executable to receive a client device request for access to a second data store; store information associated with accessing the second data store; associate the stored information for accessing the second data store with the previously assigned identifier; receive a subsequent request for access to the second data store; and access the second data store if the assigned identifier corresponds to the information associated with accessing the second data store.

In yet another embodiment of the present invention, a computer-readable medium is provided for authenticating access to multiple data stores. The method may include receiving a client device request for access to a data store; querying the client device for an identifier associated with stored information for accessing the data store; accessing the data store if the assigned identifier corresponds to the information associated with accessing the data store; and accessing a second data store if the assigned identifier corresponds to information associated with accessing the second data store. The computer-readable medium may further include program instructions for forwarding information at the data stores to the client device, wherein the forwarded information is electronic mail.

DETAILED DESCRIPTION

Figure 1:
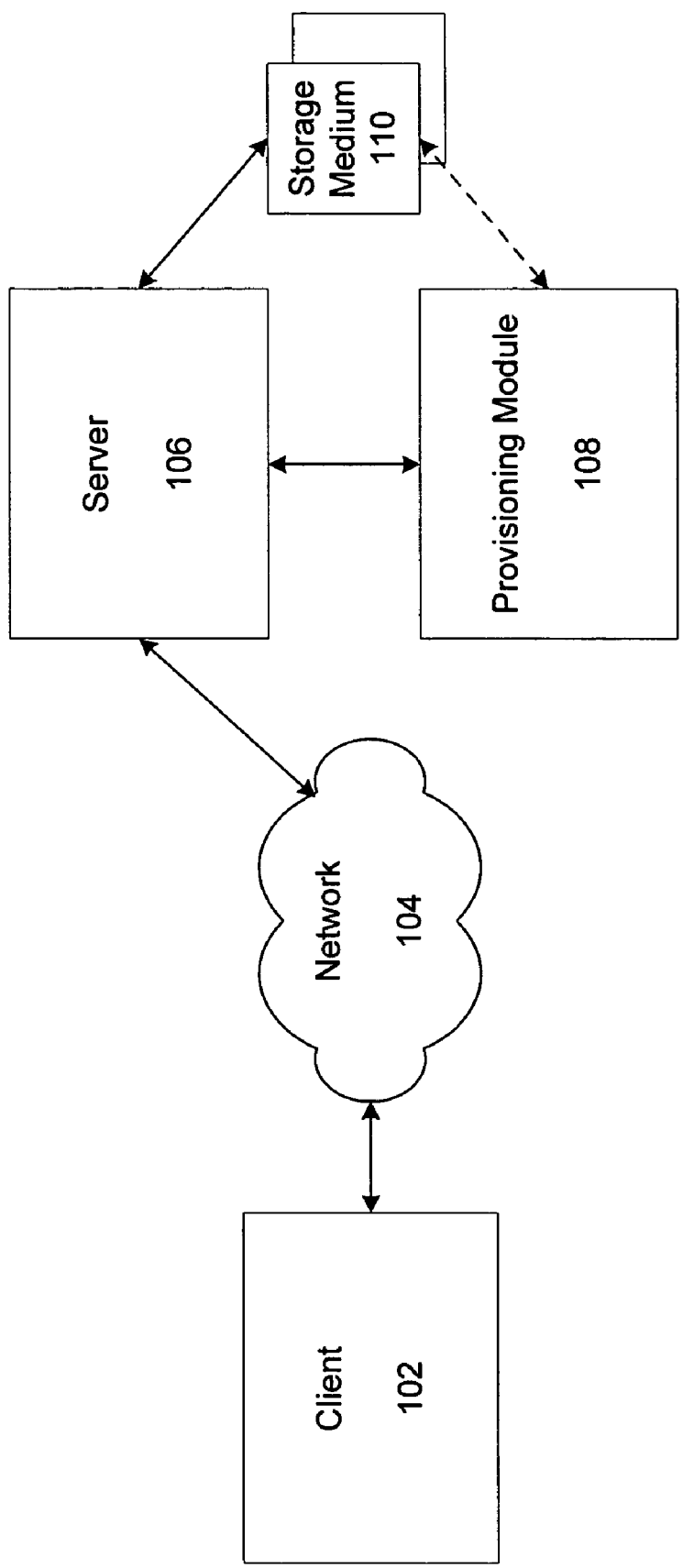
FIG. 1 shows an exemplary environment for providing simplified provisioning in accordance with one embodiment.

Referring to FIG. 1, an exemplary environment for providing simplified provisioning in accordance with one embodiment is shown. A client 102 communicates with a server 106 via a network 104. The client 102 may include any type of device, such as a cellular telephone, a personal digital assistant (PDA), a personal computer, etc.

Any type of provisioning may be provided according to various embodiments. For instance, the provisioning may include an event registering a user in response to a user request for services, a communication to the user offering services, a communication to the user including activation data, a communication to the user with a uniform resource locator (URL) where the user can obtain additional information regarding services, and so on ("provisioning event"). Any type of provisioning event is within the scope of one embodiment.

Similarly, any type of services provided by a service provider managing the provisioning events is possible. For instance, the service provider may provide internet services, application services, wireless services, and so on.

A provisioning module 108 may be coupled to the server 106 for providing provisioning event related services. In one embodiment, the provisioning module 108 is included as a component of the server 106. In another embodiment, the provisioning module 108 provides provisioning event related processing for various servers.

The server 106 may include or otherwise have access to one or more storage mediums 110. Any type of storage medium 110 may be employed according to various embodiments. In FIG. 1, the server 106 is coupled to the storage medium(s) 110 for storing and accessing information included in the storage medium(s) 110.

In an exemplary embodiment, the client 102 contacts the server 106 via the network 104 in order to request and/or access services provided by a service provider associated with the server 106. For example, a user at the client 102 may wish to subscribe to email services available by the service provider. The server 106 requests information about the user at the client 102 or about the client 102 itself before allowing the user to access services. In order to verify that the client 102 is genuine, the server 106 may access the storage medium (s) 110 to match data provided by the client 102 with information the server 106 stored in the storage medium(s) 110 as a result of prior encounters with the client 102.

Any manner of collecting information associated with the user and/or the device 102 associated with the user may be employed. The server 106 may collect the information from previous encounters with the device 102, from other service providers associated with the user and/or the device 102, and/or from any sources providing information about the user and/or the device 102.

The server 106 utilizes the provisioning module 108 to provide specified services and configurations for those services to the user at the client 102. The provisioning module 108 may verify information associated with the client 102 in one embodiment. The provisioning module 108 may have access to the storage medium(s) 110 via the server 106 or via a direct connection to the storage medium(s) 110.

Figure 2:
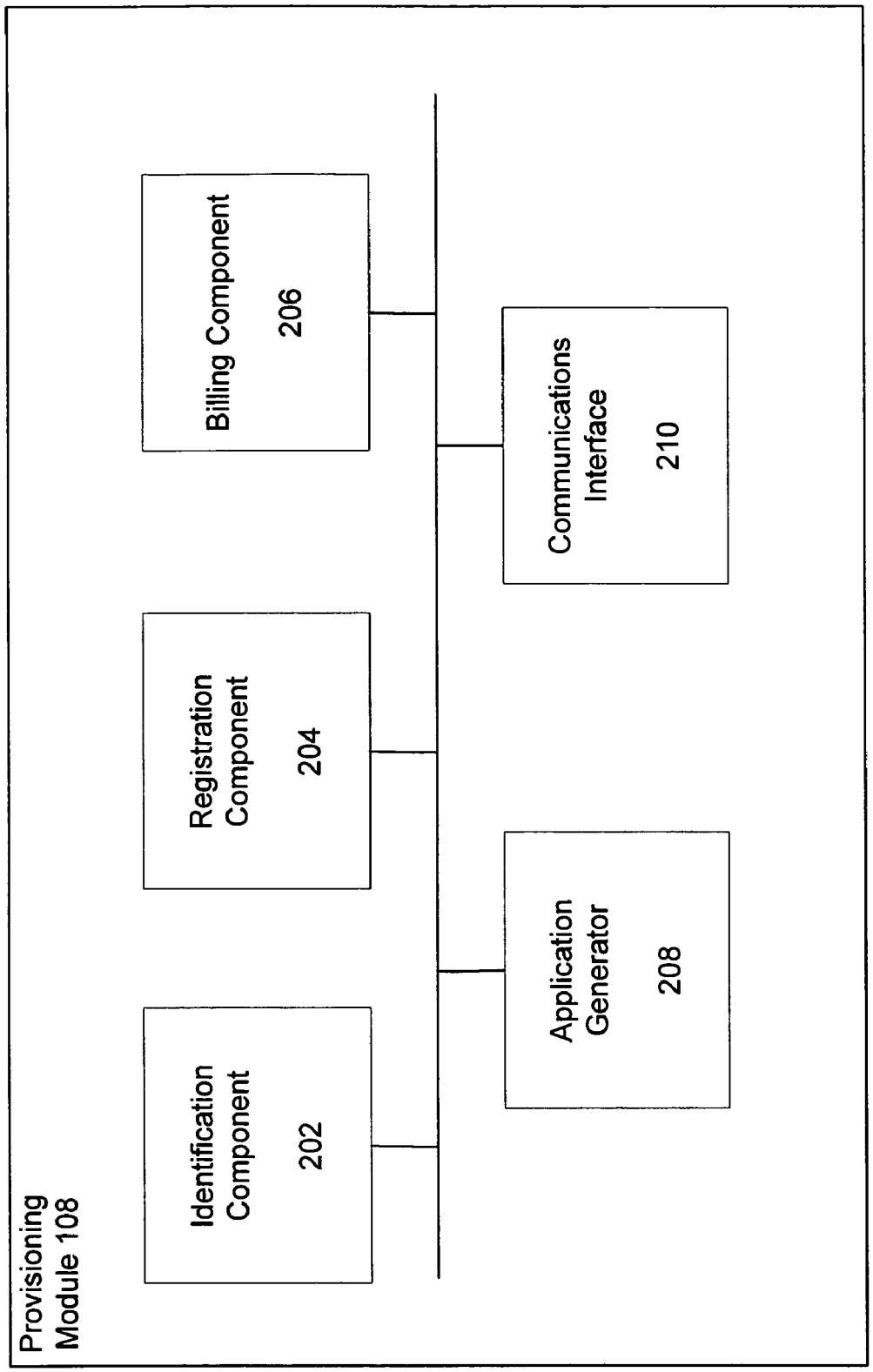
FIG. 2 shows a schematic diagram of an exemplary provisioning module in accordance with one embodiment.

Turning now to FIG. 2, a schematic diagram of an exemplary provisioning module 108 in accordance with one embodiment is shown. The provisioning module 108 may provide users with accounts, the appropriate access to those accounts, all the rights associated with those accounts, all of the resources necessary to manage the accounts, and so forth. Provisioning may be utilized to refer to service activation and may also involve programming various databases, such as the storage medium(s) 110, with the user's information, as discussed herein. Although the server 106 may be identified as performing various functions, any of the functions may be performed by the provisioning module 108 and/or components thereof.

The provisioning module 108 may include an identification component 202. The identification component 202 may perform various tasks related to identifying the client 102 and/or the user associated with the client 102. The identification component 202 may assign an identifier to the client 102 and/or information associated with the user at the client 102 when the client 102 is connected to the server 106. The identification component 202 may store the information in the storage medium(s) 110 according to the identifier the identification component 202 associates with the information.

In one embodiment, the identification component 202 assigns a unique identifier, such as a number string, to the client 102 and stores the information associated with the client 102 according to the unique identifier. The identification component 202 may then forward the unique identifier to the client 102 as a communication, or part of a communication, so that the client 102 can provide the unique identifier when the client 102 connects to the server 106 on another occasion.

In another embodiment, a phone number associated with the client 102 is utilized by the identification component 202 to store information associated with the client 102. Accordingly, when the client 102 makes further contact with the server 106, the phone number may be used to access the information stored according to the phone number. The user may provide the phone number associated with the client 102 and/or the client 102 may provide the phone number to the server 106 when initial access to the server 106 is gained by the client 102.

The identification component 202 may also compare information provided by the user of the client 102 with information stored in the storage medium(s) 110 related to the client 102. The comparison may be performed in order to verify that the user of the client 102 is the same user of the client 102 about which the server 106 captured information during a previous encounter. The comparison may also be performed to ensure that the client 102 information in the storage medium(s) 110 is accurate.

For instance, if the phone number is utilized as the identifier and the phone number provided by the user at the client 102 in response to a query is different from the phone number in the storage medium(s) 110, the user may have entered the phone number incorrectly, the original information gathered at the server 106 may have been entered incorrectly, and so on. The information from the storage medium(s) 110 and the client 102 may be compared for any reason. As discussed herein, the server 106 may collect the information associated with the user and/or the client 102 during previous encounters with the client 102 and/or from any other sources.

A registration component 204 may also be included with the provisioning module 108. The registration component 204 can utilize information from the storage medium(s) 110 to "pre-fill" or to otherwise fill in information associated with, a registration for the user associated with the client 102. The server 106 captures information about the user when the client 102 accesses the server 106 initially and/or from any other source, as discussed herein.

For example, when the client 102 logs onto the server 106 to check email, the server 106 may capture the phone number of the client 102, the username of the user associated with the client 102, or any other information associated with the client 102. The information is stored in the storage medium(s) 110 according to a unique identifier assigned by the identification component 202, according to the phone number associated with the client 102, or according to any other method. When the client 102 logs onto the server 106 again in order to request instant messaging services, for example, the registration component 204 accesses the information in the storage medium(s) 110 in order to complete a registration for the user at the client 102 requesting the services.

The registration component 204 can then query the user for any information needed for registration that is not included in the information in the storage medium(s) 110. In one embodiment, information associated with the user and the client 102 is collected by the server 106 from other sources, rather than from a previous encounter the client 102 had with the server 106, as discussed herein. For instance, another service provider may forward information associated with the client 102, the server 106 may access information about the client 102 on available databases utilizing the phone number or other information about the client 102, and so forth. Any manner of gathering information about the client 102 to pre-fill the registration for services is within the scope of an embodiment.

The registration component 204 can register the user at the client 102 for any services offered by the service provider associated with the server 106, or otherwise. In one embodiment, the registration component 204 can pre-fill information related to services being requested by the user other than identification information. For instance, the server 106 may store information related to user preferences in the storage medium(s) 110. When the user requests services, the registration component 204 may utilize the user preferences information to pre-fill feature selections associated with the requested services. For example, the registration component 204 may pre-select calendar features for the user according to user preferences captured by the server 106 about user activity related to other services, whether those services are offered by the service provider or not.

A billing component 206 may be included with the provisioning module 108. The billing component 206 can track user activity of the services provided by the service provider. Accordingly, the billing component 206 can determine when to bill the user for the services being provided. The registration component 204 can provide user information to the billing component 206 that may be needed regarding where to bill the user, such as an email address, for instance.

An application generator 208 may be included with the provisioning module 108 for configuring the application and/or services requested by the user for the device 102 associated with the user. The application generator 208 can also create the application for the user including any features the user desires. Any type of application generator, 208 may be provided.

In one embodiment, the application generator 208 may utilize provisioning templates to create the profiles for configuring various devices, such as the client 102 (FIG. 1) associated with the user. For instance, the templates may provide the parameters for creating a particular application. The user can also specify customizations to the application, which can be used to modify the template for the application by the application generator 208. In other words, the provisioning templates can provide parameters for configuring various devices for the services as well as customizing the actual service features.

A communications interface 210 may also be provided with the provisioning module 108. The communications interface 210 receives communications from the user and/or the server 106 and processes the input utilizing the components discussed herein.

Although the provisioning module 108 is described as including various components, the provisioning module 108 may include more components or fewer components than those listed and still fall within the scope of an embodiment of the invention. For example, the provisioning module 108 may also include business rules for building the applications, a customer service component for managing applications and errors, a protocol configuration component for managing a variety of protocols associated with various devices, and so forth.

Figure 3:
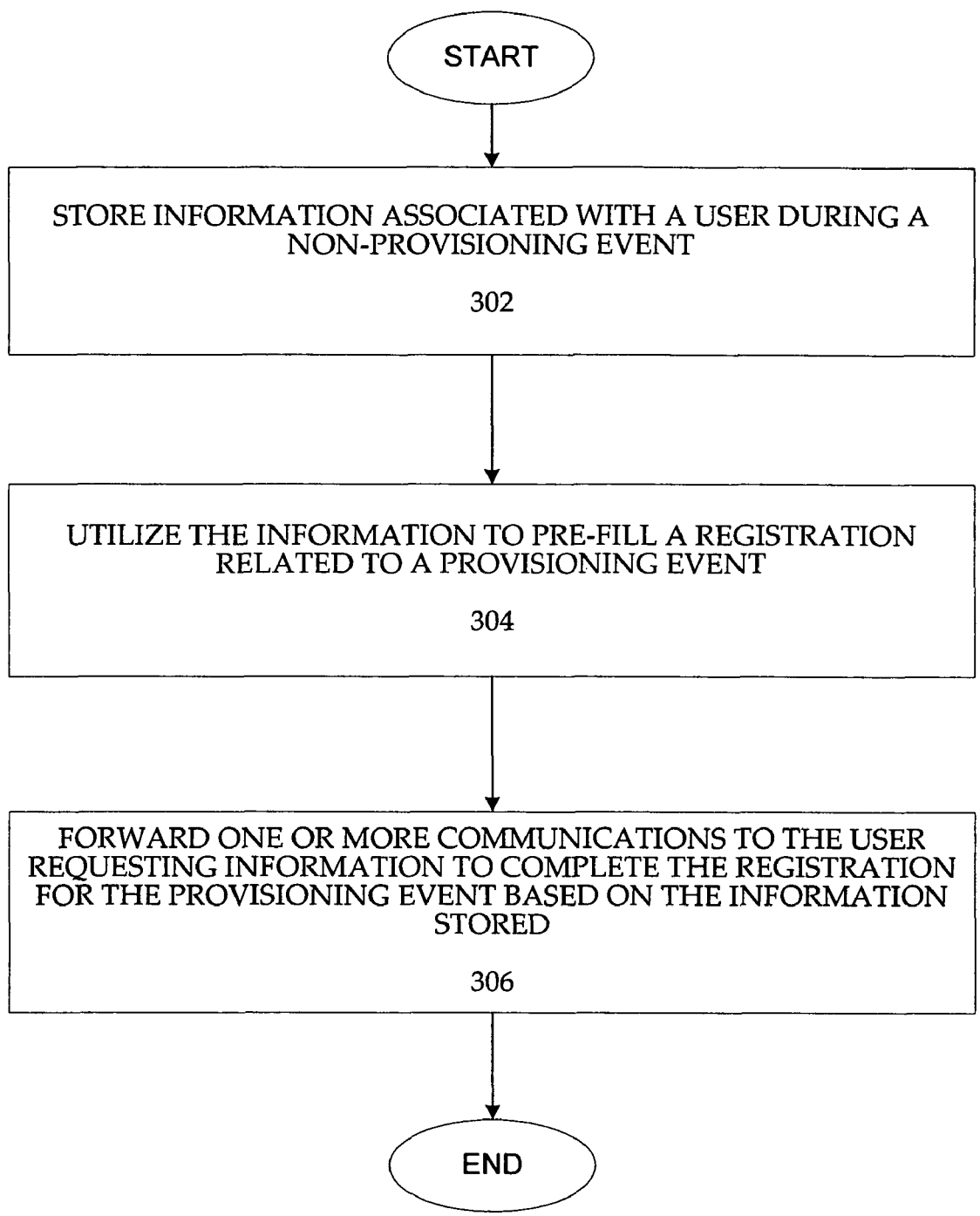
FIG. 3 shows a flow diagram of an exemplary process for providing simplified provisioning in accordance with one embodiment.

FIG. 3 shows a flow diagram of an exemplary process for providing simplified provisioning in accordance with one embodiment. At step 302, information associated with a user during a non-provisioning event is stored. As discussed herein, the information may be stored in the storage medium(s) 110. The server 106 collects information about the user and the client 102 associated with the user when contact is made with the server 106 at a time when provisioning is not occurring. In one embodiment, as discussed herein, the server may collect information related to the user and the client 102 from another source, rather than from the client 102, which also may constitute a non-provisioning event.

In one embodiment, the information related to the user and the client 102 may be collected during one or more previous provisioning events. For instance, the server 106 may store information associated with the user and the client 102 during previous provisioning events in order to avoid or limit querying the user for the same information during future provisioning events.

The information may be stored according to a phone number associated with the device 102 and/or according to a unique identifier assigned to the device 102. For example, the server 106 may assign a unique identifier to the information collected from the device 102 when the device 102 is connected to the server 106. In order to associate the unique identifier to the device 102 for recognition during future contact with the server 106, a text message, for example, can be sent to the device 102 with the unique identifier. The unique identifier may then be sent back to the server 106 to identify the device 102 if the phone number, for example, cannot be accessed by the server 106. As discussed herein, in one embodiment, the server 106 receives information about the user and/or the client 102 from a third party source and stores the information according to the phone number and/or a unique identifier.

At step 304, the information is utilized to pre-fill a registration related to a provisioning event. The information collected by the server 106 from the client 102 during a previous contact with the server 106 and/or from another source (e.g., phone network) is utilized to complete as much of a registration as possible without user input. Accordingly, the user at the client 102 is not required to provide information that the server 106 can access itself.

At step 306, one or more communications are forwarded to the user. The one or more communications are based on the information stored and request information to complete the registration for the provisioning event. In one embodiment, the information requested to complete the registration includes a user query to verify that the information used to complete the registration is correct. The information requested may include a user query to provide a password to complete the registration process, in another embodiment.

By using the information collected by the server 106 during a non-provisioning event that occurred prior to a current provisioning event to complete a registration, or a portion of the registration, the user at the client 102 can provide less information than required if no information about the user was accessible or utilized to pre-fill the registration. Accordingly, the user at the client 102 is provided with simplified provisioning.

Figure 4:
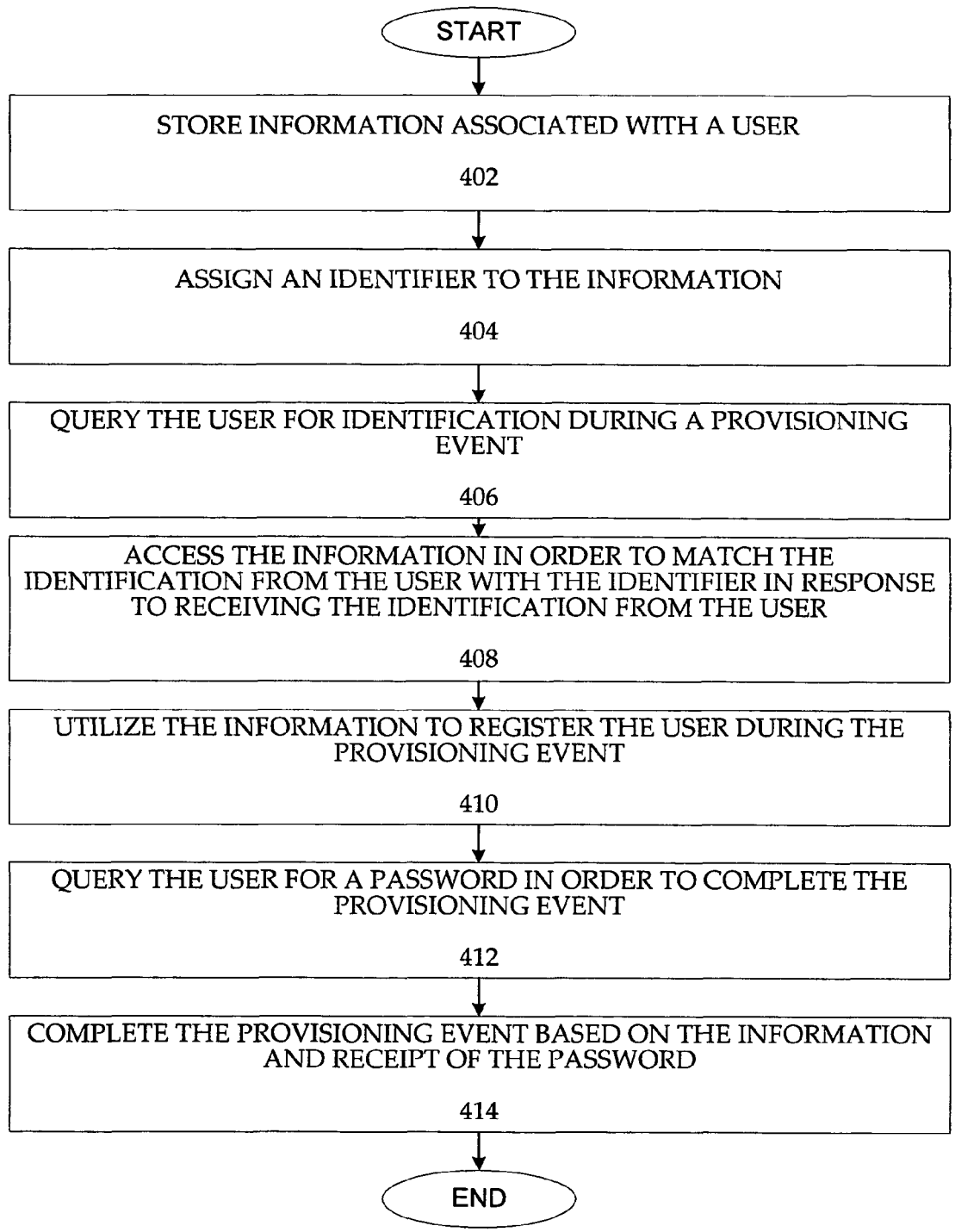
FIG. 4 shows a detailed process for providing simplified provisioning in accordance with one embodiment.

Turning now to FIG. 4, a detailed process for providing simplified provisioning in accordance with one embodiment is shown. At step 402, information associated with a user is stored. As discussed herein, the information may be stored by the server 106 to one or more storage mediums, such as the storage medium(s) 110 discussed in FIG. 1.

An identifier is assigned to the information at step 404. The identifier may be assigned to the information in order to locate the information in the storage medium(s) 110, in order to compare the information with other information provided by the user during future contacts with the server 106, and so on. The identifier may be assigned to the information for any reason. As discussed herein, the identifier may be a phone number associated with a device of the user, such as the device 102 discussed in FIG. 1, a unique identifier assigned by the identification component 202 of the provisioning module 108 associated with the server 106, and/or any other type of identifier.

At step 406, the user is queried for identification during a provisioning event. The identification sought from the user may be confirmation of the identifier used to store the information at step 404, such as the phone number and/or the unique identifier. The identification sought, however, may be any type of information from the user. For example, a "username" may be sought in order to match the username associated with the user with the username stored in the storage medium(s) 110.

At step 408, the information is accessed in order to match the identification from the user with the identifier associated with the information in response to receiving the identification from the user. The provisioning module 108 accesses the information in the storage medium(s) 110, directly or via the server 106, associated with the user and compares that information with the identification received from the user in response to the query.

By locating the information in the storage medium(s) 110 that was previously collected, the information can be utilized to register the user during the provisioning event at step 410. The information can complete the registration or a portion of the registration associated with the services for which the provisioning event is taking place. By completing the registration or a portion of the registration with information existing about the user and the user device, such as the device 102 discussed in FIG. 1, the user is only required to provide data for the registration not included in the information from the storage medium(s) 110. Thus, the user experiences a streamlined provisioning process.

In one embodiment, as discussed herein, the information is utilized to complete the registration and the user is queried to verify that the information utilized is correct. In another embodiment, the user is queried to verify the accuracy of the information utilized according to a length of time between the provisioning event and when the information was collected. For instance, if the information was collected by the server 106 less than one month prior to the provisioning event, the server 106 may not seek verification from the user that the information is still accurate.

At step 412, the user is queried for a password in order to complete the provisioning event. The password may help to ensure that an intended user receives services. For instance, the server 106 may forward the communication regarding services to a user that did not request the services or requested the services using another user's information. Provisioning related information may erroneously reach users for a variety of reasons. The user is queried for the password in order to verify that the user matches the intended user. For instance, if the provisioning information is sent to a "user b" rather than the intended "user a," "user b" will likely not know the "user a" password and resultantly will not be able to receive the services intended to go to the "user a."

The provisioning event is completed in response to receiving the password at step 414. The password is compared with a password in the storage medium(s) 110. Provided the password matches the password known for the particular user, the provisioning event may be completed. In one embodiment, the server 106 accesses another database with user password information in order to confirm that the password provided is correct. Any method of verifying the password may be employed.

As discussed herein, the information from the storage medium(s) 110 may be sufficient for completing the registration for the service provider. However, the service provider may require additional information to complete the registration. For instance, the information about the user and/or the client 102 associated with the user the server 106 originally captured may not provide enough information about the user and/or the client 102 required for the registration for the services associated with the provisioning event. Accordingly, more information may be collected from the user. As part of the simplified provisioning process described in FIG. 4, or any other exemplary provisioning process, the user may be queried for additional information to complete the registration.

In one embodiment, the server 106 stores information associated with the user during the client 102 connection with the server sometime prior to the provisioning event. Using the provisioning templates, discussed in FIG. 2 in connection with the application generator 208, the server 106 may collect other information about the user from third party databases in order to complete registration for provisioning for many of the service provider's services based on the provisioning templates. Any type of method for gathering information about the user and/or the device 102 associated with the user for simplifying provisioning is within the scope of various embodiments.

While various embodiments have been described above, it should be understood that they have been presented by way of example only, and not limitation. For example, any of the elements associated with the provisioning module may employ any of the desired functionality set forth hereinabove. Thus, the breadth and scope of a preferred embodiment should not be limited by any of the above-described exemplary embodiments. These embodiments include computer programs embodied on computer readable mediums for executing the methods disclosed herein.

What is claimed is:

1. A system for authenticating access to one or more data stores, comprising:
a server communicatively coupled to a network and the one or more data stores, wherein the server is configured to:
generate a unique identifier for a client device upon the client device initially communicating with the server;
send the unique identifier to the client device so that the client device can present the unique identifier in a subsequent communication with the server;
receive registration information from the client device;
store the registration information;
associate the stored registration information with the unique identifier of the client device;
receive via a subsequent communication with the client device a request to authenticate the client device to access the one or more data stores, wherein the request includes the unique identifier;
use the unique identifier to retrieve the stored registration information that is associated with the client device;
authenticate access to the one or more data stores on behalf of the client device using the stored registration information, and
forward information from the one or more data stores to the client device following authentication.

2. The system of claim 1, wherein the one or more data stores is associated with an electronic mail service provider.

3. The system of claim 1, wherein the client device is a cellular telephone.

4. The system of claim 1, wherein the client device is a personal digital assistant.

5. The system of claim 1, wherein the client device is a personal computer.

6. The system of claim 1, wherein the server authenticates the client device prior to the server authenticating access to the one or more data stores.

7. The system of claim 1, wherein the server authenticates a user of the client device prior to the server authenticating access to the one or more data stores.

8. The system of claim 6, wherein the authentication of the client device includes the use of the unique identifier.

9. The system of claim 6, wherein the unique identifier is a token, the token comprising a unique string of data.

10. The system of claim 7, wherein the authentication of the user of the client device includes the use of a user name.

11. The system of claim 10, wherein the authentication of the user of the client device includes the use of the user name in combination with a password.

12. A computing device for authenticating access to one or more data stores, comprising:
a communications interface that exchanges registration information and identification information over a network;
an identification module stored in memory and executable by a processor to:
create a unique identifier for a client device when the client device initially communicates with the computing device;
send to the unique identifier to the client device so that the client device can provide the unique identifier for verification purposes when the client device subsequently communicates with the computer device;
receive registration information from the client device;
store the registration information received from the client device; and
associate the unique identifier with the stored registration information so that the unique identifier can be used to retrieve the stored registration information when the client device subsequently communicates with the computing device; and
a registration module stored in memory and executable by a processor to:
receive via a subsequent communication with the client device a request to authenticate the client device to access the one or more data stores, wherein the request includes the unique identifier;
use the unique identifier to retrieve the stored registration information previously received from the client device;

query the client device for registration information required for accessing the one or more data stores that is not currently present in the stored registration information;

authenticate access to the one or more data stores by the client device using the stored registration information and/or the additional registration information, wherein the client device need not make contact with the one or more data stores for the purpose of authentication.

13. The computing device of claim 12, wherein the communications interface receives information from the one or more data stores following authentication of the client device or user thereof.

14. The computing device of claim 13, wherein the communication interface forwards the information received from the one or more data stores to the client device.

15. The computing device of claim 12, wherein the unique identifier is a token comprising a unique string of data.

16. The computing device of claim 12, wherein the unique identifier is a telephone number.

17. A method for authenticating access to one or more data stores, comprising:

receiving at a server registration information from a client device;

generating a unique identifier for a client device upon the client device initially communicating with the server;

sending the unique identifier to the client device so that the client device can present the unique identifier in a subsequent communication with the server;

storing the registration information associated with accessing the one or more data stores;

assigning the unique identifier to the stored registration information;

receiving a subsequent request from the client device to authenticate the client device to access the one or more data stores;

querying the client device to provide the unique identifier instead of the registration information upon determination that the registration information has been previously provided by the client device;

accessing the stored registration information assigned to the unique identifier;

using the stored registration information to authenticate the client device to access the one or more data stores.

18. The method of claim 17, further comprising querying the user to verify that the collected registration information associated with the unique identifier is correct.

19. The method of claim 18, wherein the user is queried to verify the accuracy of the collected registration information according to a length of time between registering the user for the requested service and when the collected information was collected.

20. The method of claim 18, further comprising querying the user for a password to complete the registration for the requested service.

* * * * *